US010972342B2

(12) United States Patent
Shenoy et al.

(10) Patent No.: US 10,972,342 B2
(45) Date of Patent: Apr. 6, 2021

(54) NETWORK DEVICE CONFIGURATION USING A MESSAGE BUS

(71) Applicant: Juniper Networks, Inc., Sunnyvale, CA (US)

(72) Inventors: Vivekananda Shenoy, Sunnyvale, CA (US); Sreelakshmi Sarva, San Jose, CA (US); Jacopo Pianigiani, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 81 days.

(21) Appl. No.: 16/221,698

(22) Filed: Dec. 17, 2018

(65) Prior Publication Data

US 2020/0195501 A1 Jun. 18, 2020

(51) Int. Cl.
*G06F 15/177* (2006.01)
*H04L 12/24* (2006.01)
*G06F 9/54* (2006.01)

(52) U.S. Cl.
CPC .......... *H04L 41/0816* (2013.01); *G06F 9/542* (2013.01); *G06F 9/546* (2013.01);
(Continued)

(58) Field of Classification Search
CPC . H04L 41/0803; H04L 41/08; H04L 41/0816; H04L 63/101; H04L 63/1408; H04L 65/403; H04L 67/1031; H04L 67/32
(Continued)

(56) References Cited

U.S. PATENT DOCUMENTS

| 5,838,907 A | 11/1998 | Hansen |
| 6,286,038 B1 | 9/2001 | Reichmeyer et al. |

(Continued)

FOREIGN PATENT DOCUMENTS

| EP | 2879330 A1 | 6/2015 |
| EP | 3382546 A1 | 10/2018 |

OTHER PUBLICATIONS

Kohler et al., "ZeroSDN: A Highly Flexible and Modular Architecture for Full-Range Distribution of Event-Based Network Control," IEEE Transactions on Network and Service Management, vol. 15, No. 4, Oct. 3, 2018, 15 pp.
(Continued)

*Primary Examiner* — Wing F Chan
*Assistant Examiner* — Andrew Woo
(74) *Attorney, Agent, or Firm* — Shumaker & Sieffert, P.A.

(57) ABSTRACT

In general, techniques are described for managing, with a network controller for a computer network, the configuration of network devices within the computer network using one or more message buses. In some examples, a controller includes processing circuitry coupled to memory. The processing circuitry is configured to generate data for implementing a configuration change for a network device and store, to a configuration database, the data for implementing the configuration change for the network device. The processing circuitry is further configured to add, to a message queue of a message bus executed by one or more or more computing devices separate from the controller, an indication of the configuration change for the network device to cause the network device to obtain, from the configuration database, the data for implementing the configuration change for the network device.

20 Claims, 5 Drawing Sheets

(52) U.S. Cl.
CPC ...... *H04L 41/0859* (2013.01); *H04L 41/0863* (2013.01); *H04L 41/0873* (2013.01); *H04L 41/0893* (2013.01); *G06F 2209/548* (2013.01)

(58) Field of Classification Search
USPC .................................................. 709/223, 226
See application file for complete search history.

(56) References Cited

U.S. PATENT DOCUMENTS

| | | | |
|---|---|---|---|
| 6,684,241 B1 | 1/2004 | Sandick et al. | |
| 2003/0149756 A1* | 8/2003 | Grieve ................ | H04L 41/0866 709/223 |
| 2007/0268516 A1 | 11/2007 | Bugwadia et al. | |
| 2008/0086545 A1* | 4/2008 | Fatt ....................... | H04W 24/02 709/220 |
| 2017/0279853 A1* | 9/2017 | Armstrong .......... | H04L 41/0604 |
| 2017/0339144 A1 | 11/2017 | Han et al. | |
| 2018/0287902 A1 | 10/2018 | Chitalia et al. | |

OTHER PUBLICATIONS

Tran et al., "EQS: an Elastic and Scalable Message Queue for the Cloud," Third IEEE International Conference on Cloud Computing Technology and Science, IEEE Computer Society, Applicant points out, in accordance with MPEP 609.04(a), that the year of publication, 2011, is sufficiently earlier than the effective U.S. filing date, so that the particular month of publication is not in issue, 8 pp.

Extended Search Report from counterpart European Application No. 19180809.6, dated Nov. 29, 2019, 9 pp.

Bierman et al., "RESTCONF Protocol", Network Working Group, draft-ietf-netconf-restconf-18, Oct. 27, 2016, 133 pp.

Chisholm et al., "NETCONF Event Notifications", RFC 5277, Network Working Group, Jul. 2008, 35 pp.

Response to Extended Search Report dated Nov. 29, 2019 from counterpart European Application No. 19180809.6, filed Dec. 22, 2020, 11 pp.

\* cited by examiner

NETWORK DEVICE CONFIGURATION USING A MESSAGE BUS

TECHNICAL FIELD

The disclosure relates to computer networks and, more particularly, to configuring network devices of computer networks.

BACKGROUND

A computer network is a collection of interconnected computing devices that exchange data and share resources. In a packet-based network, the computing devices communicate data by dividing the data into small blocks called packets, which are individually routed across the network from a source device to a destination device. The destination device extracts the data from the packets and assembles the data into its original form. A computer network may include a plurality of network devices, where each network device of the plurality of network devices is configured to exchange information (e.g., packets, pods, containers, services, or other data) with other devices within the network. Communications within the network may, in some cases, occur in accordance with a network configuration.

An intent-based network system (IBNS) is an approach for managing a computer network configuration. Within an IBNS, a user may specify an intended configuration to a controller, and the controller may determine respective network configurations for network devices and "push" the respective configurations to the network devices using protocols such as Network Configuration Protocol (NETCONF), Secure Shell (SSH), and Remote Procedure Calls (RPCs).

SUMMARY

In general, techniques are described for managing, with a network controller for a computer network, the configuration of network devices within the computer network using one or more message buses. For example, a controller may use a message bus to publish a notification of a pending change to the configuration of a network device. The network device may detect the notification via the message bus and responsively obtain configuration data for configuring the network device. The message bus may be, in some examples, a lightweight message broker (e.g., RabbitMQ, Kafka, etcd) and may be used to distributing notifications and/or configuration data between the controller and the network devices. In some examples, each network device subscribes to the message bus to receive notifications. Network devices may subscribe to different, respective message queues or multiple network devices may subscribe to the same message queue and each message may identify the network device that is to pull the notification.

In some examples, a network device may, in response to a notification via the message bus of a new configuration available for the network device, obtain and compare the new abstract configuration for the network device to a current abstract configuration for the network device. If there is a difference, the network device may determine the configuration commands or configuration data for configuring the network device to implement the difference and in this way conform the network device to the intended configuration as represented by the new abstract configuration. The abstract configuration is result of evaluating an intent in conjunction with a current state of the network.

In some examples, a network device may notify, using the message bus, the controller of changes to the configuration of the network device. For instance, the network device may detect a modification of the configuration of the network device and responsively publish a notification to the message bus. The controller may subscribe to the message bus to obtain the notification and, in response to the notification, may obtain the configuration of the network device. Policies applied by the controller to the obtained configuration may determine one or more actions (or a no-action/no-op) to be applied by the controller to address a modification to the configuration of the network device.

The techniques of this disclosure may provide one or more technical improvements or advantages. For example, publishing notifications to a message bus which instruct network devices to retrieve configuration data may increase the network device configuration scalability. Because the resources in network bandwidth, processing power, memory, etc., of the controller may be a bottleneck for configuring many hundreds or even thousands of network devices, it may be beneficial to instruct network devices to retrieve configuration data from a configuration data store, rather than using the controller to push the configuration data to the network devices directly. Such techniques may decrease an amount of time required to distribute and apply configuration changes in a large number of network devices and decrease a likelihood of a controller failure. In addition, by generating abstract configurations for the network devices, the techniques may improve the versatility of controller to interoperate with network devices manufactured by multiple different vendors that use many different formats for operational configurations. Each network device may be responsible for translating an abstract configuration, which may be applicable to any network device, into its operational configuration data. As another example, using a message bus for message and configuration passing between network devices and the controller may also increase the versatility of and simplify the controller, for the controller may implement fewer protocols that would otherwise be needed for communicating with different types of network devices manufactured by different vendors.

In some cases, the controller may assign a version number to each configuration change applied to a network device, and store data indicative of the configuration associated with each version number. This may enable the network device to retrieve data associated with a previous version of the configuration of the network device.

In addition, or alternatively, by notifying a controller of modifications made to a network device, the techniques may in some cases increase the likelihood of consensus between the intended network configuration for multiple network devices and the actual network configuration of the network devices. This may reduce misconfiguration and unintended operations of the network devices with respect to, e.g., network packet forwarding or other handling.

In some examples, a controller includes processing circuitry coupled to memory. The processing circuitry is configured to generate data for implementing a configuration change for a network device, store, to a configuration database, the data for implementing the configuration change for the network device, and add, to a message queue of a message bus executed by one or more or more computing devices separate from the controller, an indication of the configuration change for the network device to cause the network device to obtain, from the configuration database, the data for implementing the configuration change for the network device.

In other examples, a network device includes processing circuitry coupled to memory. The processing circuitry is configured to receive, from a message queue of a message bus executed by one or more or more computing devices separate from a controller that manages the network device, an indication of a configuration change for the network device, obtain, from a configuration database, in response to the indication, data for implementing the configuration change for the network device, and implement the configuration change, based on the data, to modify a configuration of the network device.

In other examples, a computing system includes a controller inlcudes first processing circuitry coupled to a first memory. The first processing circuitry is configured to generate data for implementing a configuration change for a network device, store, to a configuration database, the data for implementing the configuration change for the network device, and add, to a message queue of a message bus executed by one or more or more computing devices separate from the controller, an indication of the configuration change for the network device. Additionally, the network device includes second processing circuitry coupled to a second memory. The second processing circuitry is configured to receive, from the message queue of the message bus, the indication of the configuration change for the network device, obtain, from the configuration database, in response to the indication, data for implementing the configuration change for the network device, and implement the configuration change, based on the data, to modify a configuration of the network device.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
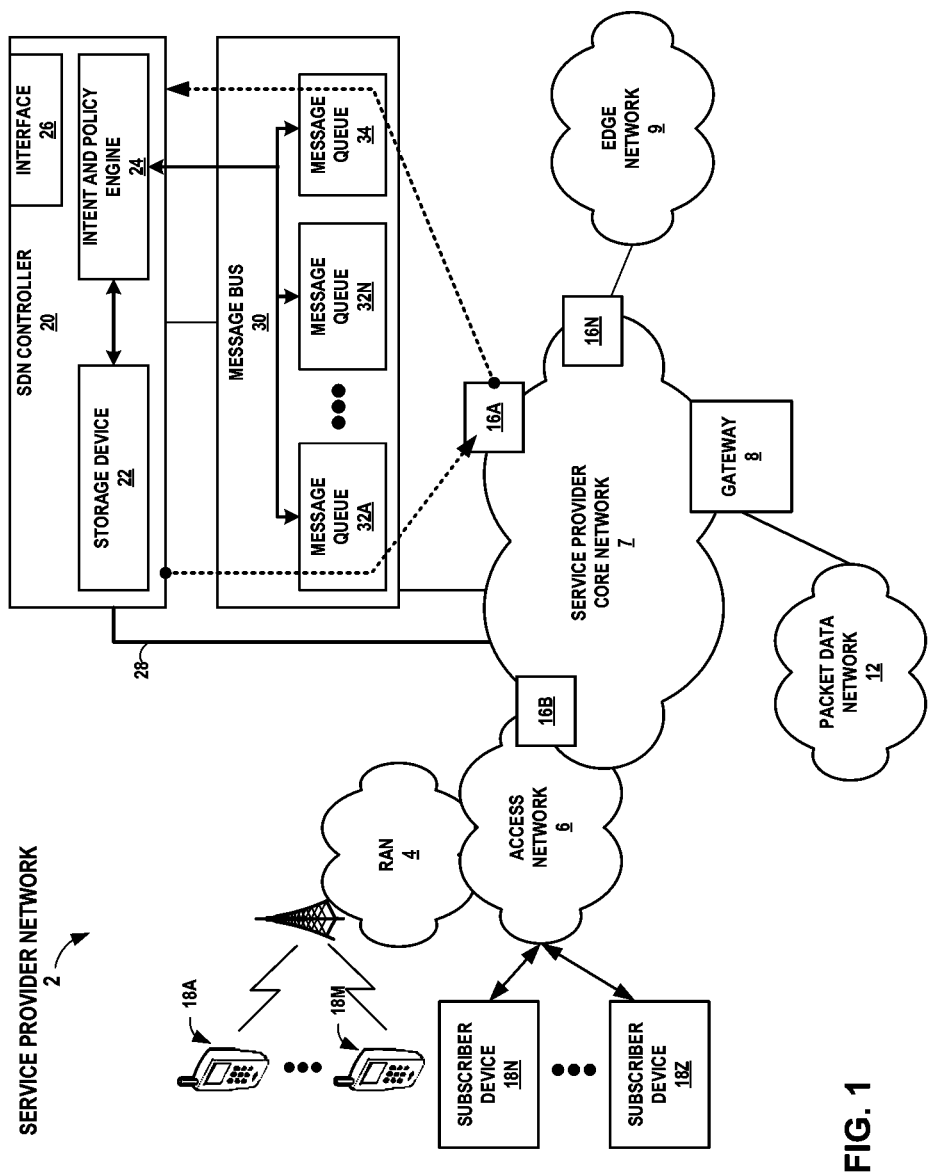
FIG. 1 illustrates an example network system in accordance with one or more techniques of this disclosure.

FIG. 1 illustrates an example network system in accordance with one or more techniques of this disclosure. The example network system of FIG. 1 includes a service provider network 2 that provides, using network devices 16A-16N (collectively, "network devices 16"), packet-based network services to subscriber devices 18A-18Z (collectively, "subscriber devices 18"). That is, service provider network 2 provides authentication and establishment of network access for subscriber devices 18 such that the subscriber devices may exchange data packets with packet data network (PDN) 12, which may represent an internal or external packet-based network such as the Internet, or edge network 9 using packet-based network services. Although described with respect to a service provider operating a service provider network 2, network 2 may in some examples represent an enterprise network managed by a large enterprise. Thus, references to a "service provider" or "provider" may similarly refer to an "enterprise manager," "network manager," or "operator." In addition, although described primarily with respect to "subscribers" that connote end-users of a service provider network services, the techniques described herein are similarly applicable to "customers" of the service provider and to customer devices such as cell towers, multi-tenant units (MTUs), residential aggregation points, and so forth. Examples of customers may include universities, businesses, or any other entities that purchase, lease, or otherwise use services provided by service provider network 2.

Network devices 16 are managed at least in part by SDN controller 20, which in cooperation with service provider network 2 provides software-defined networking for configuring network devices 16 to operate according to intents programmed to SDN controller 20 via interface 26. Intents refer to high-level operating requirements for the service provider network 2 that specify what services or policies that service provider network 2 is to implement. As such, service provider network 2 implements an intent-based network system (IBNS) for managing the configuration of service provider network 2 and, more specifically, of individual network devices 16. Within an IBNS, a user, service provider network 2 operator/administrator, software agent, or other entity may specify an intended configuration (i.e., an "intent") to SDN controller 20, and the SDN controller 20 may determine respective low-level network configurations for one or more of network devices 16. Put another way, SDN controller 20 may translate intents received via interface 26 into a desired state for the service provider network 2 and may then generate configuration data (or "configuration state") for one or more of network devices 16. SDN controller 20 is an example of a network controller or a controller for a network.

Network devices 16 are interconnected via communication links (not shown for ease of illustration) to form a communication topology in order to exchange packet data. Network devices 16 may include, for example, routers, switches, gateways, bridges, hubs, servers, firewalls or other intrusion detection systems (IDS) or intrusion prevention systems (IDP), another type of computing device or network device, or a combination of such devices. While described in this disclosure as transmitting, conveying, or otherwise supporting packets, service provider network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting network devices 16 may be physical links (e.g., optical, copper, and the like) or wireless.

In the example of FIG. 1, service provider network 2 includes access network 6 ("access network 6") that provides connectivity to PDN 12 and edge network 9 via service provider core network 7 and gateway 8. Service provider core network 7 and PDN 12 provide packet-based services that are available for request and use by subscriber devices 18. As examples, service provider core network 7 and/or PDN 12 may provide, for example, bulk data delivery, voice over Internet protocol (VoIP), Internet Protocol television (IPTV), Short Messaging Service (SMS), Wireless Application Protocol (WAP) service, or customer-specific application services. PDN 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. PDN 12 executes one or more packet data protocols (PDPs), such as IP (IPv4 and/or IPv6), X.25 or Point-to-Point Protocol (PPP), to enable packet-based transport of PDN 12 services.

Subscriber devices 18 connect to gateway 8 via access network 6 to receive connectivity to subscriber services for applications hosted by network devices 16. A subscriber may represent, for instance, an enterprise, a residential subscriber, or a mobile subscriber. Subscriber devices 18 may be, for example, personal computers, laptop computers or other types of computing device associated with subscribers. In addition, network devices 16 may include mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 18 may run a variety of software applications, such as word processing and other office support software, web browsing software, software to support voice calls, video games, videoconferencing, and email, among others. Subscriber devices 18 connect to access network 6 via access links that include wired and/or wireless communication links. The term "communication link," as used herein, includes any form of transport medium, wired or wireless, and can include intermediate nodes such as network devices. Each of the access links may include, for instance, aspects of an asymmetric DSL network, WiMAX, a T-1 line, an Integrated Service Digital Network (ISDN), wired Ethernet, or a cellular radio link.

A network device configuration may, in some examples, be applied to each network device of network devices 16. A network device configuration for a network device 16 specifies the operational configuration of the network device 16. A network device configuration may specify configurations for control, forwarding, and services. Configurable features of a network device may include interfaces, chassis components, management, security, protocols, network address translation (NAT), services such as virtual private networks, quality of service, and so forth. Configuration changes applied to network device 16A may alter the operations of network device 16A within service provider network 2.

Additionally, the configuration of network devices 16 may include selecting one or more of network devices 16 for "admin" status. For example, the one or more of network devices 16 chosen for admin status may have special privileges within service provider network 2. The configuration of network devices 16 may also include the determination of security rules and communication protocols. For example, service provider network 2 may update one or more security rules which determine secure communications with network devices 16. Service provider network 2 may select one or more encryption algorithms, such as Rivest-Shamir-Adleman (RSA), advanced encryption standard (AES), elliptic curve integrated encryption scheme (ECIES), data encryption standard (DES), twofish, threefish, or key exchange method, for performing secure communications within service provider network 2.

Transport nodes of the access network 6 connect access nodes to border nodes that enable inter-region packet transport. Border nodes may include area border routers and autonomous system boundary routers (ASBRs). In the illustrated example, border nodes (not shown) couple access network 6 to core network 7.

Service provider core network 7 may represent a network that is owned and operated by a service provider to interconnect a plurality of networks, which may include access network 6, PDN 12, and edge network 9. Service provider core network 7 may implement Multi-Protocol Label Switching (MPLS) forwarding and in such instances may be referred to as an MPLS network or MPLS backbone. PDN 12 may represent an edge network coupled to core network 7, e.g., by a customer edge device such as customer edge switch or router. Edge network 9 may include a data center.

Access network 6, core network 7, and edge network 9 may include service nodes that apply services to subscriber packets. Service node examples include L2 provider edge (PE) or L3 PE routers, broadband network gateway (BNGs), peering routers, content servers, media gateways, base station controllers, and so forth. Illustrated gateway 8 includes an example of a service node.

In examples of network 2 that include a wireline/broadband access network, gateway 8 may represent a Broadband Network Gateway (BNG), a Broadband Remote Access Server (BRAS), MPLS Provider Edge (PE) router, core router, L2/L3 PE router, or gateway, for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

Edge network 9 may represent, e.g., a business edge network, broadband subscriber management edge network, mobile edge network, customer site such as enterprise branch offices, or a combination thereof. In some examples, edge network 9 may offer service provider managed network-hosted Value-Added Services (VAS) including application-aware, and subscriber-aware services and charging, for instance. Access network 6 of FIG. 1 is also an example of an edge network for service provider network 2. Edge network 9 may alternatively represent a data center/value-added services complex that offers services by a computing environment including, e.g., a scalable cluster of general computing devices, such as x86 processor-based servers. As another example, the computing environment may include a combination of general-purpose computing devices and special purpose appliances. Service provider core network 7 may couple to multiple edge networks, such as any of the aforementioned examples of edge network 9.

As virtualized, individual network services provided by service nodes of the data center can scale through the allocation of virtualized memory, processor utilization, storage and network policies, as well as by adding additional load-balanced virtual machines. In one example, edge network 9 may include a data center that includes a set of interconnected, high-performance yet off-the-shelf packet-based routers and switches that implement industry standard protocols.

Software-defined networking (SDN) controller 20, in one example, may include one or more processors that are configured to implement functionality and/or execute instructions. SDN controller 20 may be executed by one or more computing devices, such as real or virtual servers. SDN controller 20 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry. In the example illustrated in FIG. 1, SDN controller 20 includes storage device 22, intent and policy engine 24, and interface 26.

Storage device 22 may be configured to store information within SDN controller 20 during operation. Storage device 22 may include a computer-readable storage medium or computer-readable storage device. Storage device 22 may include, for example, one or more hard disk. Storage device 22 may represent an on-device or off-device configuration database to store abstract (or high-level) configurations for network devices 16, intents, low-level (or actual) configurations for network devices 16, configuration snippets for network devices 16, and/or other configuration data for network devices 16.

In accordance with techniques described in this disclosure, intent and policy engine 24 of SDN controller 20 may, in some examples, determine and drive configuration changes to network devices 16. For example, intent and policy engine 24 analyzes data indicative of an intended configuration for network devices 16 and compares the data indicative of the intended configuration with data indicative of current configurations of network devices 16, which may be stored to storage device 22 as abstract configurations. In this way, intent and policy engine 24 determine differences between actual configurations of network devices 16 and the intended configurations for network devices 16, which may be input by a user as intents. Intent and policy engine 24 may output, via message bus 30, instructions to network devices 16 in response to determining that configuration changes are necessary. Additionally, intent and policy engine 24 receives data via message bus 30, in some cases from network devices 16.

Interface 26 may represent a northbound interface to receive intents in the form of commands, statements, a markup language, according to one or more definitions or schemas for the interface 26. Interface 26 may be a REST application programming interface (API). Interface 26 may integrate with an automation stack, such as Puppet, Chef, Ansible, CFEngine, or SaltStack. Interface 26 may integration with an orchestration stack, such as Kubernetes, OpenStack, vCloudDirector, Contrail, Tungsten Fabric, or CloudStack. Interface 26 may include a command-line interface (CLI), graphical user interface (GUI), or alternatively, another type of interface. For example, the user may input an intended configuration to SDN controller 20 via interface 26, and SDN controller 20 may determine configuration changes to be made to network devices 16 in order to implement the intended configuration.

In accordance with techniques described in this disclosure, SDN controller 20 for service provider network 2 manages the configuration of network devices 16 using one or more message buses. In the example of FIG. 1, SDN controller 20 uses a message bus 30 to deliver indications of new network configuration data to network devices 16 and, in some cases, to receive indications of new configurations of the network devices 16 caused by an entity that is not SDN controller 20. Message bus 30 represents one or more computing devices that implement a message bus to enable SDN controller 20 and network devices to exchange messages. Message bus 30 may include a message broker software, such as RabbitMQ™, ActiveMQ, Apache Kafka, StormMQ, executed by the one or more computing devices. Message bus 30 may communicate according to one or more of a plurality of different message protocols, e.g., Advanced Message Queuing Protocol (AMQP), Streaming Text Oriented Message Protocol (STOMP), Message Queuing Telemetry Transport (MQTT), and/or Hypertext Transfer Protocol (HTTP).

In some examples, message bus 30 includes message queues which organize and transfer information between a sending devices and a receiving devices. A message queue may organize information in an order in which the information was placed on the message queue. The general operation of a single message queue is as follows: a first device may add (or "send" or "post") messages to the top of a message queue, and a second device may retrieve (or "consume") the messages from the bottom of the message queue. The second device may retrieve the messages in the order in which the messages were added to the message queue by the first device. Thus, in such examples, a single message queue may allow the messages to travel in a single direction from the first device to the second device. Another message queue may enable the second device to transmit messages to the first device. A sending device may request a message queue from message bus 30, which one or more receiving devices may subscribe to in order to receive push messages, or which one or more receiving devices may poll in order to obtain messages added to the message queue by the sending device. A sending device may also be referred to as a producer, and a receiving device may also be referred to as a consumer.

Message bus 30 includes message queues 32A-32N and 34 (collectively, "message queues 32"). In some examples, message bus 30 includes a separate message queue 32 corresponding to each of network devices 16. For example, message queue 32A may receive messages added by SDN controller 20 and intended for network device 16A, message queue 32B may receive messages added by SDN controller 20 and intended for network device 16B, and message queue 32N may receive messages added by SDN controller 20 and intended for network device 16N. In some cases, a message queue of message bus 30 may be used by SDN controller 20 to send messages to multiple network devices 16. In such case, each such message may identify one or more network devices 16 that are intended recipients.

Message bus 30 also includes message queue 34, which accepts messages from network devices 16 intended for SDN controller 20. As such, message queue 34 delivers messages in the opposite direction of message queues 32A-32N. When a network device of network devices 16 (e.g., network device 16A) posts a message to message queue 34, network device 16A may attach an identifier to the message indicating that the message was added by network device 16A. Each network device of network devices 16 may attach identifiers to data posted to message queue 34, thus enabling SDN controller 20 to determine a source of data that SDN controller 20 retrieves from message queue 34. In some cases, one or more networks devices 16 may have different, respective instances of messages queue 34 for sending messages to SDN controller 20.

In some examples, message bus 30 produces acknowledgement receipts, which notify a source device that a message has been received by a respective destination device. For example, if SDN controller 20 posts a message to message queue 32A intended for network device 16A, message bus 30 may issue an acknowledgement receipt to SDN controller 20 when the message is retrieved from message queue 32A by network device 16A.

Message bus 30 interacts with SDN controller 20 via intent and policy engine 24. As such, intent and policy engine 24 may, in some examples, generate information posted to message bus 30 by SDN controller 20. In other examples, SDN controller 20 may post information to message bus 30 that is received by SDN controller 20 via interface 26.

Service provider network 2 may in some cases include a device management system, separate from SDN controller 20, for configuring network devices 16. An operator/administrator may use an interface to the device management system to configure network devices 16 without using SDN controller 20.

SDN controller 20 determines and directs the implementation of configuration changes in network devices 16. In some examples, intent and policy engine 24 of SDN controller 20 updates an abstract configuration to reflect a configuration change, where the abstract configuration and the configuration change are associated with a network device of network devices 16, such as network device 16A. The abstract configuration may be stored in storage device 22. The configuration change may, in some cases, be determined by SDN controller 20.

For example, SDN controller 20 may receive, via interface 26, data indicative of an intended configuration for one or more of network devices 16, such as an intent. SDN controller 20 may compare the data indicative of the intended configuration with a state of the network already stored by storage device 22. In some examples, SDN controller 20 may determine that there is a difference between the data indicative of the intended configuration and the state of the of the network. In response to determining the difference, intent and policy engine 24 may determine whether a configuration change needs to be applied to network device 16A (for instance). If so, intent and policy engine 24 may generate a new abstract configuration for network device 16A and may store the new abstract configuration for network device 16A to storage device 22.

After generating a new abstract configuration for network device 16A, SDN controller 20 publishes an indication of a new abstract configuration for network device 16A to message bus 30. For example, SDN controller 20 may publish the indication to message queue 32A uniquely associated with network device 16A or to a common message queue with an identifier for network device 16A included in the indication. Network device 16A receives the indication of the new abstract configuration by retrieving the indication from message bus 30, e.g., from message queue 32A.

In some examples, the indication of the new abstract configuration sent from SDN controller 20 to network device 16A includes a notification to obtain new configuration data stored to storage device 22. In response to the indication of the new abstract configuration, network device 16A obtains the new abstract configuration from storage device 22. For example, network device 16A may query a configuration database stored by storage device 22 to obtain the new abstract configuration.

Network device 16A may determine, based on the new abstract configuration, whether a configuration change to the network device 16A is needed. For example, network device 16A may compare an existing abstract configuration stored by the network device 16A, which represents the existing actual device configuration, to the new abstract configuration. If there is a difference, network device 16A may determine and execute a set of commands or determine new configuration data with which to modify the operational configuration data for network device 16A.

In some examples, rather than an indication of the new abstract configuration includes new configuration data or a set of configuration commands for execution by network device 16A. In some such examples, the configuration change may represent a relatively minor configuration change that can be represented in a relatively small amount of data. Network device 16A may obtain the set of configuration commands from message queue 32A and execute the configuration commands to modify its operational configuration data. Network device 16A may alternatively store the new configuration data to modify its operational configuration data. Other techniques for modifying the network device 16A configuration may be performed. After performing a configuration update, network device 16A may publish a verification message to message queue 34 indicating that the configuration change is implemented. In turn, SDN controller 20 may retrieve the verification message from message queue 34 to verify that the intent of the operator/administrator or other entity has been implemented, at least with respect to network device 16A. SDN controller 20 may perform similar configuration-related operations with respect to one or more of network devices 16B-16N to implement the intent.

In some case, network device 16A may store at least one previous version of the configuration of network device 16A. Each previous version may be associated with a unique version number. For example, if SDN controller 20 causes network device 16A, or any of network devices 16, to make a primary configuration change, SDN controller 20 may associate a version number with the primary configuration change. After network device 16A implements the primary configuration change, network device 16A may store data indicative of the configuration resulting from the primary configuration change and attach the version number to the data indicative of the configuration.

Although it may be beneficial to direct configuration changes to network devices 16 using SDN controller 20, in some examples an operator/administrator or other entity may cause a configuration change to one or more network devices 16 without using SDN controller 20, such as by a GUI/CLI or by using a device management system separate from SDN controller 20. Configuration changes that are initiated using SDN controller 20 may be referred to herein as "primary configuration changes." Alternatively, configuration changes initiated using network devices 16 may be referred to herein as "secondary configuration changes." The adjectives "primary" and "secondary" are not intended to describe any order or preference among the configuration changes.

Network device 16A may receive data indicative of a secondary configuration change, where the secondary configuration change represents an intended configuration change made by a user of network device 16A. Network device 16A may modify the configuration of network device 16A based on the data, and network device 16A may send an indication that its configuration has modified according the secondary configuration change. For example, network device 16A may publish the indication to message bus 34, and SDN controller 20 may consume the indication from message bus 34. In some examples, network device 16A is configured to send data indicative of the secondary configuration change to SDN controller 20 via connection 28. Connection 28 may be part of a management network or an ip-fabric connection.

It may be beneficial for SDN controller 20 to evaluate secondary configuration changes initiated by network devices 16 and determine if each respective secondary configuration change is permissible. For example, SDN controller 20 may receive data indicative of the secondary configuration change to network device 16A via connection 28, and SDN controller 20 is configured to compare the data indicative of the secondary configuration change to the abstract configuration associated with network device 16A to determine if the secondary configuration change is permissible. Since the abstract configuration may be reflective of an intended configuration for network devices 16 input to interface 26 by a user of SDN controller 20.

In some examples, SDN controller 20 determines that a secondary configuration change to network device 16A is permissible. In such examples, intent and policy engine 24 is configured to update the abstract configuration associated with network device 16A. In some examples, after SDN controller 20 determines that the secondary configuration change is permissible, intent and policy engine 24 is configured to post a confirmation message to message queue 32A, the confirmation message affirming that the secondary configuration change is approved and recorded.

In some examples, SDN controller 20 determines that a secondary configuration change to network device 16A is not permissible. In response to determining that the secondary configuration change is not permissible, SDN controller 20 is configured to send a notification including an instruction to roll back the second configuration change to network device 16A via message bus 30. Put another way, SDN controller 20 is configured to send a notification to network device 16A to restore the configuration of network device 16A to a state that existed prior to the implementation of the secondary configuration change. For example, the notification to restore the configuration may include a version number, and an instruction to update the configuration of network device 16A to reflect a configuration associated with the version number. Network device 16A is configured to, in some examples, request data indicative of the configuration associated with the version number via connection 28, and SDN controller 20 may provide the data indicative of the configuration associated with the version number via connection 28. In other examples, network device 16A is configured to store the data indicative of the configuration associated with the version number.

Although network devices 16, SDN controller 20, and message bus 30 are described herein as being deployed within service provider network 2, one or more techniques of this disclosure may be used within any combination of a private network, one or more data centers, a campus area network (CAN), an enterprise network, or another type of network in which a SDN controller or other network controller configures one or more network devices.

Figure 2:
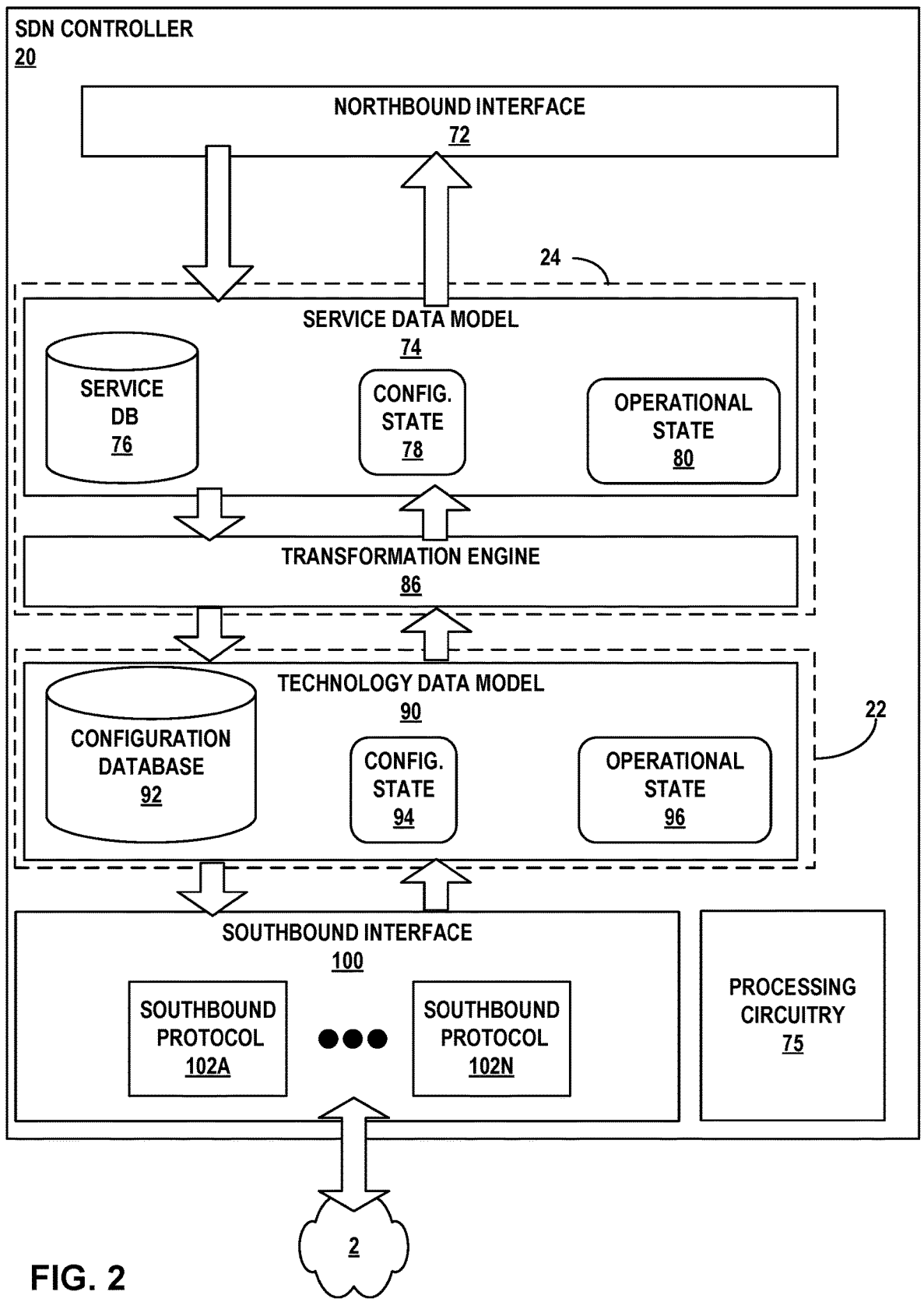
FIG. 2 is a block diagram illustrating an example instance of a software-defined networking (SDN) controller, in accordance with one or more techniques of this disclosure.

FIG. 2 is a block diagram illustrating an example instance of SDN controller 20, in accordance with one or more techniques of this disclosure. SDN controller 20 is a logically centralized but in some cases physically distributed controller for a network that may be configured to manage configurations of one or more network devices, such as network devices 16 of FIG. 1 SDN controller 20 includes, in this example, an intent and policy engine 24 configured to determine and drive configuration changes to network devices 16. SDN controller 20 may be an example of SDN controller 20 of FIG. 1. Intent and policy engine 24 may be an example of intent and policy engine 24 of FIG. 1. Storage device 22 may be an example of storage device 22 of FIG. 1.

SDN controller 20 may include processing circuitry 75. Processing circuitry 75 may include one or more processors that are configured to implement functionality and/or process instructions for execution within SDN controller 20. For example, processing circuitry 75 may be capable of processing instructions stored by storage device 22. Processing circuitry 75 may include, for example, microprocessors, DSPs, ASICs, FPGAs, or equivalent discrete or integrated logic circuitry, or a combination of any of the foregoing devices or circuitry.

Some components of SDN controller 20 are not shown for ease of illustration purposes. These components may include hardware and instructions to execute modules of SDN controller 20. SDN controller 20 presents a northbound interface 72 that may be invoked by other controllers in a hierarchical arrangement of controllers or by an orchestrator, administrator, or other entity, to modify configuration state 78 ("config. state 78") or extract operational state 96 of the SDN controller 20 that is descriptive of the service data model 74. Northbound interface 72 may represent an example instance of interface 26 of FIG. 1. Northbound interface 72 may be used for integration with an orchestration system such as OpenStack; northbound interface 72 may also or alternatively used by other applications or the operator's Operations Support Systems (OSS)/Business Support Systems (BSS). Northbound interface 72 may in some cases present a RESTful Application Programming Interface (API).

Service database 76 stores objects that represent instantiated services within a formal service data model 74. The high-level service data model 74 may include, e.g., a demand calendar and constraints upon the network directed by the provider/enterprise. Transformation engine 86 transforms the service objects in service database 76 from the high-level service data model 74 to corresponding lower-level objects in the technology data model 90. Transformation engine 86 may include a schema transformer. In this sense, transformation engine 86 operates as a compiler of service data model 74 to technology data model 90. Whereas the high-level service data model 74 describes services previously requested and instantiated or being processed for eventual instantiation with the network segment under control of SDN controller 20, the low-level technology data model 90 describes how those services are implemented or are to be implemented within the network, as represented in configuration database 92. Configuration database 92 may include, for example, an object that describes a TE-LSP that at least partially implements a service in service database 76. Configuration database 92 further includes identifiers of network resources of the network managed by SDN controller 20, such as network resources 5 of service provider network 2. The technology data model 90 includes configuration state 94 that describes respective configurations of the network devices as well as operational state 96 that describes respective operational characteristics of the network devices, such as load, available bandwidth, etc. Configuration database 92 and service database 76 may each represent, e.g., a SQL, POSTGRESQL, or NoSQL database such as Cassandra, or another type of structured or unstructured database.

Put another way, the high-level service data model 74 describes the desired state of the network under the control of SDN controller 20 at a very high level of abstraction, using objects that map directly to services provided to end users for example, a virtual network, a connectivity policy, or a security policy. The low-level technology data model 90, on the other hand, describes the desired state of the network at a very low level of abstraction, using objects that map to specific network protocol constructs such as a BGP route target or a VxLAN network identifier. Accordingly, southbound interface 100 executes one or more southbound protocols 102A-102K (collectively, "southbound protocols 102") with which SDN controller 20 may obtain configuration state 94 and operational state 96 from and inject configuration state 94 and operational state 96 into a network segment under the control of SDN controller 20, where configuration state 94 and operational state 96 store objects intelligible to southbound protocols 102 and mapped to constructs of southbound protocols 102. In this way, intent and policy engine 24 may make the state of the network under control of SDN controller 20 match the desired state of the network as received by intent and policy engine 24 via northbound interface 72 and represented by service data model 74. Southbound protocols 102 may include protocols for path provisioning as well as for topology discovery. For example, southbound protocols 102 may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network devices, and SNMP. Southbound protocols 102 may also include protocols for communicating with a message bus.

In accordance with techniques described in this disclosure, northbound interface 72 may receive an intent and store the intent to service database 76, which stores one or more intents corresponding to network services. Intents may be expressed using any language or schema, such as XML or JSON. Transformation engine 86 may use the intent to generate new abstract configurations for one or more network devices managed by SDN controller 20 and store the new abstract configurations to configuration database 92. Transformation engine 86 may use multiple intents stored to service database 76 to generate the new abstract configurations or, in addition or alternatively, may use existing abstract configurations to aid in generating the new abstract configurations from the new intent.

Southbound interface 100 may use one or more southbound protocols 102 to add an indication of a new abstract configuration for network device 16A (for instance) to message bus 32A. Network device 16A receives the indication from message bus 32A and obtains the new abstract configuration for network device 161 from configuration database 92.

Figure 3:
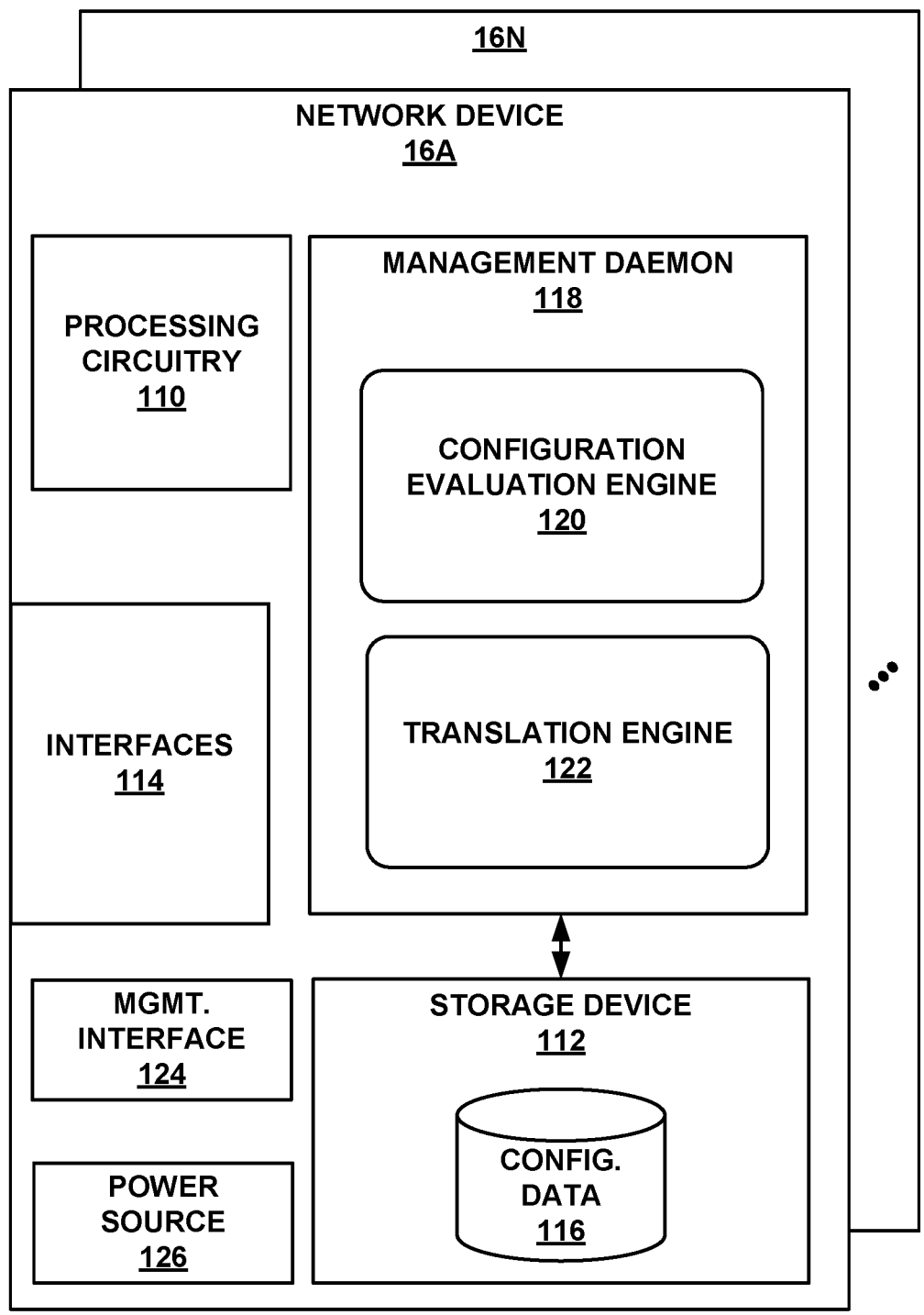
FIG. 3 is a block diagram illustrating an example network device, in accordance with one or more techniques of this disclosure.

FIG. 3 is a block diagram illustrating an example network device 16A, in accordance with one or more techniques of this disclosure. Network device 16A includes processing circuitry 110, storage device 112, interfaces 114, management daemon 118, user interface 124, and power source 126. Storage device 112 may include configuration data 116. Management daemon 118 may include configuration evaluation engine 120 and translation engine 122. Each of network devices 16 includes similar components to perform similar functionality, said components and functionality being described hereinafter with respect to network device 16A.

Network device 16A includes one or more processors (e.g., processing circuitry 110) coupled to memory comprising instructions representing one or more software processes, including user interface 124 and management daemon 118. Management daemon 118 or user interface 124 may receive configuration data via a network management protocol session, such as NETCONF session. Network device 16A stores a running configuration for forwarding network packets in configuration data (CONFIG. DATA) 116. Management daemon 118 includes configuration evaluation engine 120, and translation engine 122. Configuration data 116 may be stored to a storage device 112 and may be in the form of one or more tables, databases, linked lists, radix trees, or other suitable data structure.

Processing circuitry 110 may include one or more processors that execute software instructions, such as those used to define a software or computer program, stored to a computer-readable storage medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively or additionally, processing circuitry 110 may include dedicated hardware, such as one or more integrated circuits, one or more ASICs, one or more Application Specific Special Processors (ASSPs), one or more FPGAs, or any combination of one or more of the foregoing examples of dedicated hardware, for performing the techniques described herein.

Storage device 112 may be configured to store information within network device 16A during operation. Storage device 112 may include a computer-readable storage medium or computer-readable storage device. In some examples, storage device 112 includes one or more of a short-term memory or a long-term memory. Storage device 112 may include, for example, a hard disk, RAM, DRAM, SRAM, magnetic discs, optical discs, flash memories, or forms of EPROM or EEPROM. In some examples, storage device 112 is used to store program instructions for execution by processing circuitry 110. Storage device 112 may be used by software or applications (e.g., management daemon 118) running on network device 16A to store information during program execution.

Network device 16A may use interfaces 114 to communicate with external systems via one or more networks, e.g., access network 6 of FIG. 1. Interfaces 114 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, network device 16A uses interfaces 114 to communicate with external systems, e.g., SDN controller 20, and message bus 30 from FIG. 1.

Management daemon 118 may, in the example of FIG. 3, include a computer program that operates on network device 16A. In some examples, management daemon 118 is a background process, operating "behind the scenes" of network device 16A without being controlled by a user. In some ways, management daemon 118 functions to manage the configuration and the re-configuration of network device 16A. For example, management daemon 118 may perform "semantic" checks, which validate that a configuration or a proposed configuration of network device 16A is coherent and understandable. If management daemon 118 identifies a problem with a configuration or a proposed configuration of network device 16A, management daemon 118 may output a notification to user interface 124 which indicates the problem. Semantic checks may be performed on both of "primary configuration changes" driven by SDN controller 20 and "secondary configuration changes" driven by an operator/administrator using user interface 124 or other management interface (not shown) to configure network device 16A.

In the example of FIG. 3, management daemon 118 includes configuration evaluation engine 120. Configuration evaluation engine 120 is a module which is configured to communicate, via interfaces 114, with SDN controller 20 to obtain abstract configurations from SDN controller 20. Additionally, configuration evaluation engine 120 is configured to determine a difference between abstract configurations obtained from SDN controller 20 and the present configuration of network device 16A. Configuration evaluation engine 120 may be configured to determine differences between any two or more configurations of network device 16A. The any two or more configurations may include any combination of present, past, or new configurations of network device 16A or another network device, as well as any representation of a potential configuration of network device 16A or another network device.

To determine the difference between two or more configurations, configuration evaluation engine 120 may use translation engine 122 to parse data indicative of the two or more configurations such that the data may be analyzed by configuration evaluation engine 120. For example, translation engine 122 may parse data indicative of the two or more configurations and determine an organizational hierarchy within the two or more configurations as indicated by the data. Translation engine 122 may employ linguistic parsing techniques. In other words, translation engine 122 may take the data indicative of the two or more configurations and build a data structure. In some examples, translation engine 122 may be programmed by a user. In other examples, translation engine 122 may be created using a compiler generator. The data structure may include at least one of a parse tree, an abstract syntax tree, a flowchart, or another visual representation. As such, configuration evaluation engine 120 is configured to compare data structures corresponding to each of the two or more configurations to determine the differences between the two or more configurations.

In some examples, network device 16A is configured to receive, via interfaces 114, an indication of a configuration change. In some examples, the indication of the configuration change is received at interfaces 114 from SDN controller 20 via message bus 30. The configuration change may be reflected in an abstract configuration stored in a storage device of SDN controller 20. management daemon 118 may modify a configuration of network device 16A in accordance with the configuration change. In some cases, the indication of the configuration change includes a set of instructions enabling management daemon 118 to apply the configuration change, where the configuration change includes a difference between an intended configuration and a configuration of network device 16A. As such, the set of instructions may be small enough to be relayed from SDN controller 20 to network device 16A by message bus 30. In some examples, the set of instructions includes a computer-readable file encoded in at least one of YAML, JSON, and OpenConfig.

In other examples, information for applying the configuration change may be too large to be contained within a notification relayed by message bus 30. In such examples, the indication of the configuration change includes a notification to apply the configuration change. In response to receiving the indication of the configuration change, network device 16A is configured to send, to SDN controller 20 via interfaces 114 and connection 28, a request to obtain the abstract configuration. Network device 16A may receive, from SDN controller 20 via connection 28, the abstract configuration. Additionally, configuration evaluation engine 120 is configured to compare the abstract configuration with data indicative of a present configuration of network device 16A (e.g., configuration data 116) to determine a difference between the abstract configuration and configuration data 116. In response to determining the difference, management daemon 118 may update a configuration of network device 16A based on the difference.

In some cases, configuration evaluation engine 120 represents a small client program developed using Python, Ruby, GO, or other programming language; a script; or a combination of programs and scripts.

Power source 126 is configured to deliver operating power to the components of network device 16A. Power source 126 may include a battery and a power generation circuit to produce the operating power. In some examples, the battery may be rechargeable to allow extended operation. Recharging may be accomplished by electrically coupling power source 126 to a cradle or plug that is connected to an alternating current (AC) outlet. In addition, recharging may be accomplished through proximal inductive interaction between an external charger and an inductive charging coil within network device 16A. In other examples, traditional batteries (e.g., nickel cadmium or lithium ion batteries) may be used. In addition, network device 16A may be directly coupled to an alternating current outlet to operate.

Network device 16A, in some examples, is configured to receive, via user interface 124, data indicative of a secondary configuration change to network device 16A. Subsequently, management daemon 118 may modify the configuration of network device 16A based on the data indicative of the secondary configuration change. Network device 16A is configured to send, via interfaces 114, an indication that the configuration is modified according to the secondary configuration change. Additionally, network device 16A is configured to send, via interfaces 114, the data indicative of the secondary configuration change.

In some cases, in response to sending the indication that the configuration of network device 16A is modified according to the secondary configuration change, network device 16A receives a notification via interfaces 114, where the notification indicates that the secondary configuration change is impermissible, and where the notification includes an instruction to "roll back" the secondary configuration change. Alternatively, in some cases, after sending the indication that the configuration of network device 16A is modified according to the secondary configuration change, network device 16A receives a notification via interfaces 114 that the secondary configuration change is permissible.

In cases where the notification includes an instruction to roll back the secondary configuration change, the notification may further include a first version number. The instruction to roll back the secondary configuration change may include an instruction to change the configuration of network device 16A to reflect a configuration associated with the first version number. For example, configuration evaluation engine 120 is configured to determine a second version number associated with the present configuration of network device 16A and compare the first version number with the second version number. In response to determining that the first version number is different from the second version number, network device 16A is configured to send, via interfaces 114, a request for data indicative of a configuration associated with the first version number. Network device 16A may receive, via interfaces 114, the data indicative of the configuration associated with the first version number, and management daemon 118 may modify the configuration of network device 16A according to the data indicative of the configuration associated with the first version number.

Figure 4:
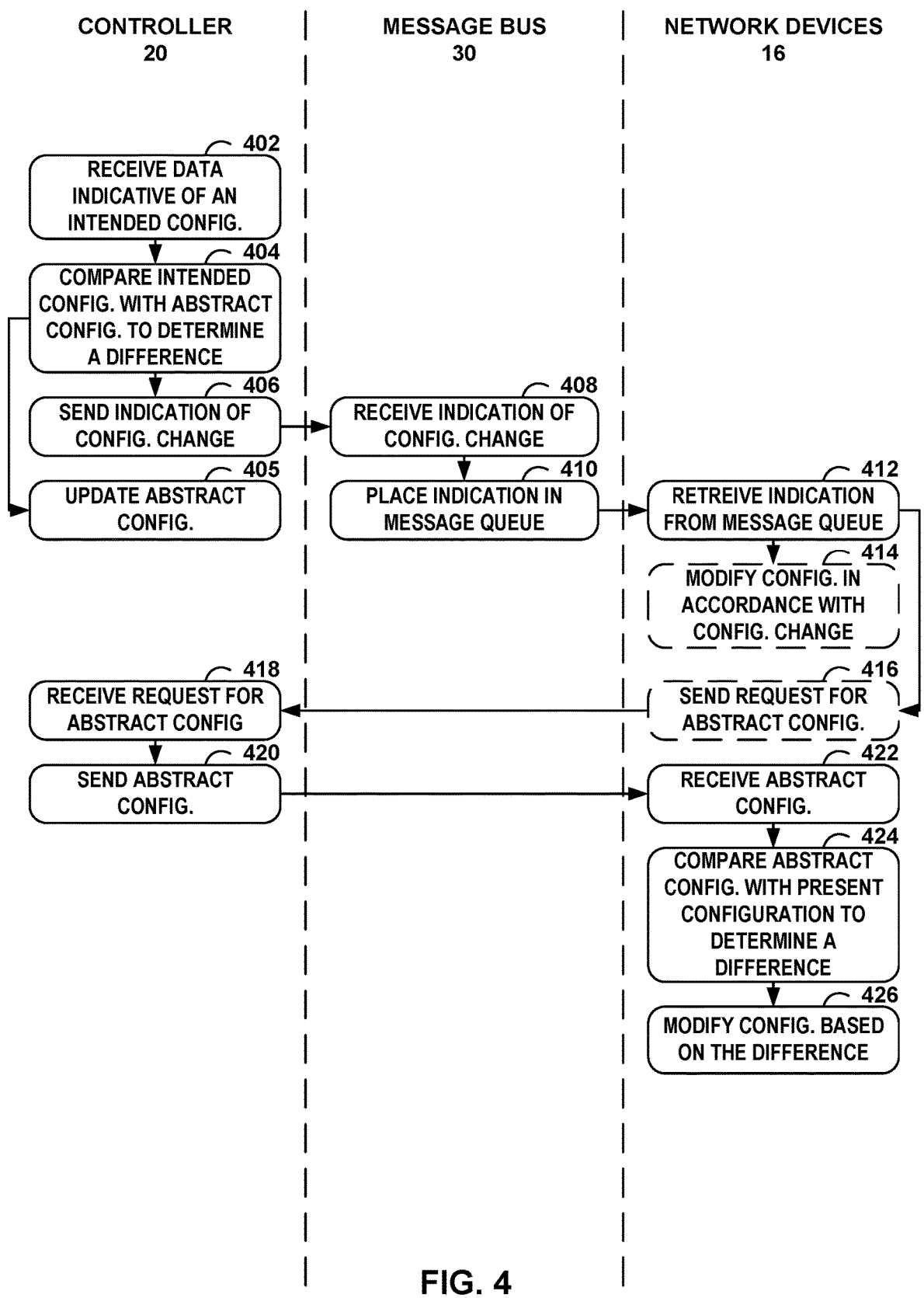
FIG. 4 is a flow diagram illustrating an example operation in accordance with one or more techniques of this disclosure.

FIG. 4 is a flow diagram illustrating an example operation in accordance with one or more techniques of this disclosure. The example operation is described with respect to SDN controller 20, message bus 30, and network devices 16 of FIGS. 1-3, and components thereof.

SDN controller 20 is configured to receive data indicative of an intended configuration (402). In some examples, the intended configuration is received by SDN controller 20 via interface 26. For instance, interface 26 may include or be connected to a user interface, which enables a user to provide an input representative of the intended configuration. The intended configuration indicates a desired state of a configuration of at least one of network devices 16 and the intended configuration may be implemented at least in part by SDN controller 20. In some examples, the intended configuration specifies the same configuration for each of network devices 16. In other examples, the intended configuration specifies a unique configuration for at least one of network devices 16.

After SDN controller 20 receives the intended configuration, SDN controller 20 compares the intended configuration with an abstract configuration to determine a difference (404). The abstract configuration may, in some cases, be a representation of a present configuration of at least one of network devices 16. The abstract configuration, along with other abstract configurations representing the present configurations of the rest of network devices 16, may be stored in storage device 22 of SDN controller 20. In this way, SDN controller 20 is configured to determine a difference between the intended configuration and the present configuration of each of network devices 16. SDN controller 20 updates the abstract configuration (405) to account for the difference between the intended configuration and the current configuration. Thus, the abstract configuration reflects the intended configuration. Additionally, subsequent to determining the difference between the intended configuration and the present configuration of a network device (e.g., network device 16A), SDN controller 20 outputs an indication of a configuration change (406), where the indication of the configuration change is intended to reach network device 16A.

Message bus 30 receives the indication of the configuration change (408) from SDN controller 20 and places the indication in a message queue (410) of a plurality of message queues (e.g., message queues 32). Message bus 30 may be configured to place the indication of the configuration change in message queue 32A which corresponds to network device 16A. By the same token, message bus 30 may be configured to place indications, notifications and messages intended for a particular network device into a corresponding message queue. Message queue 32B corresponds to network device 16B, message queue 32C corresponds to network device 16C, and so on.

Network device 16A retrieves the indication of the configuration change from message queue 32A (412). In some examples, message queue 32A acts like a "stack," where SDN controller 20 is configured to post a sequence of messages, indications, and notifications (collectively, "data segments") on the "top" of the stack. Network device 16A is configured to retrieve the sequence of data segments from the "bottom" of the stack in the same order that the sequence of data segments was placed on the top of the stack by SDN controller 20. In this way, message queue 32A relays the sequence of data segments in a single direction, from SDN controller 20 to network device 16A. By the same token, message queues 32B-32N relay data segments in a single direction from SDN controller 20 to respective network devices 16B-16N. In some examples, message bus 30 includes an open-source message broker software program, such as RabbitMQ™. Message bus 30 is configured to communicate according to a plurality of different message protocols, e.g., AMQP, STOMP, MQTT, and HTTP.

In some examples, management daemon 118 of network device 16A modifies the configuration of network device 16A based on the indication of the configuration change (414). In some such examples, the configuration change represents a difference between a current configuration of network device 16A and an intended configuration corresponding to network device 16A, and the difference may be represented by a data segment that is small enough to be relayed by message queue 32A of message bus 30. By modifying the configuration of network device 16A, management daemon 118 may implement the difference such that the intended configuration is realized in network device 16A.

In other examples, upon retrieving the indication from message queue 32A, network device 16A sends a request for an abstract configuration to SDN controller 20 (416), the abstract configuration representing the intended configuration of network device 16A. Network device 16A may send the request over a connection 28 which is separate from message bus 30. In these examples, the difference between the intended configuration and the present configuration of network device 16A may not be represented by a data segment that is small enough to be relayed by message bus 30. SDN controller 20 may receive the request for the abstract configuration (418) and send the abstract configuration (420) to network device 16A over the connection 28. As such, SDN controller 20 does not "push" the intended configuration to network device 16A. Rather, network device 16A retrieves the intended configuration in response to receiving the indication via message bus 30.

Network device 16A receives the abstract configuration (422) and management daemon 118 of network device 16A compares the abstract configuration with the present configuration of network device 16A to determine a difference (424). This difference determined by network device 16A may, in some cases, be the same difference determined by SDN controller 20 (404). Subsequently, management daemon 118 may modify the configuration of network device 16A based on the difference (426).

Although the techniques of FIG. 4 are described with respect to network device 16A, the techniques may be applied to determine, manage, or update the configurations of any combination of network devices 16.

Figure 5:
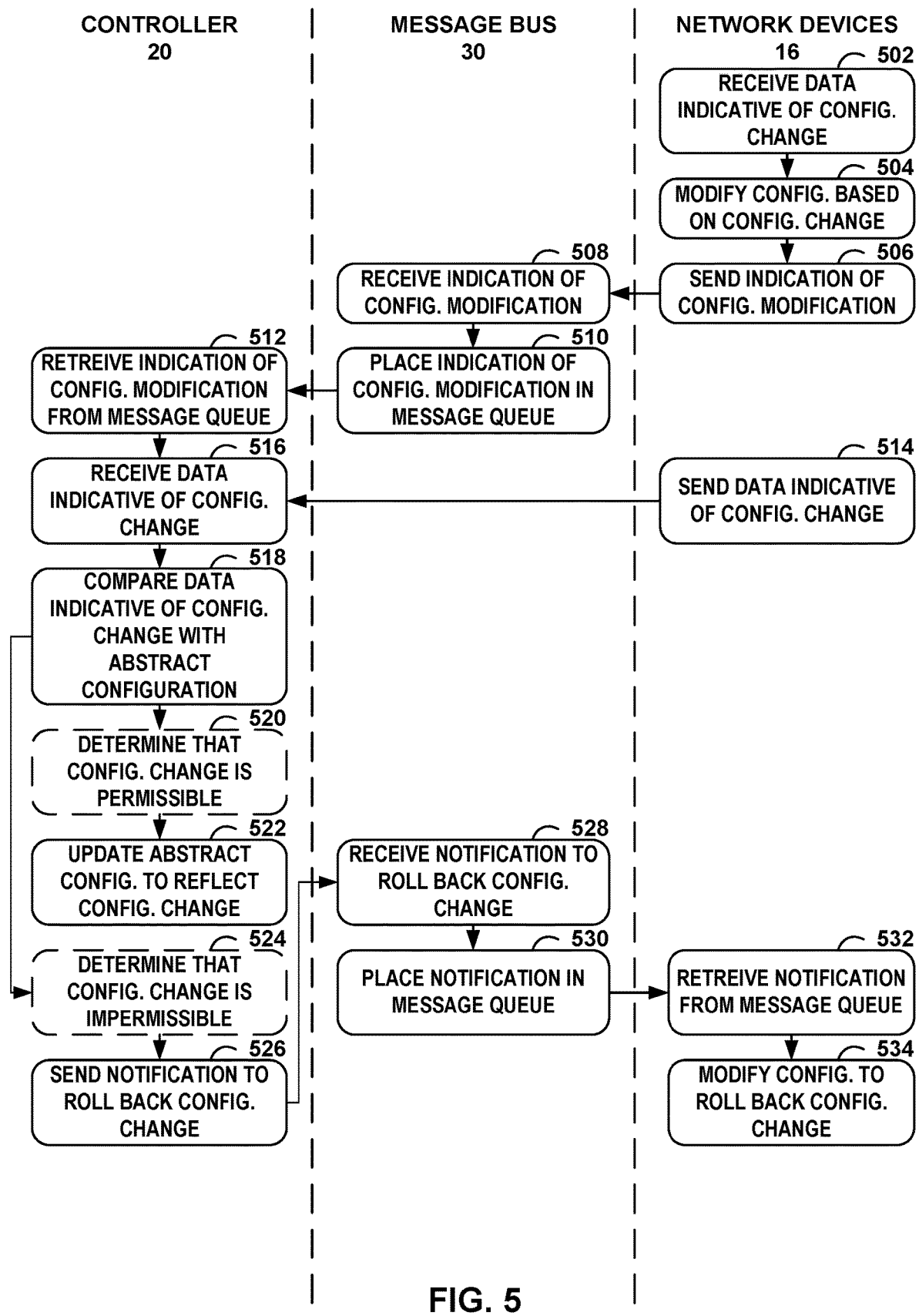
FIG. 5 is a flow diagram illustrating another example operation in accordance with one or more techniques of this disclosure.

FIG. 5 is a flow diagram illustrating another example operation in accordance with one or more techniques of this disclosure. The example operation is described with respect to SDN controller 20, message bus 30, and network devices 16 of FIGS. 1-3, and components thereof.

User interface 124 of network device 16A receives data indicative of a configuration change (502). In some examples, the data indicative of the configuration change may be entered into user interface 124 by a user of network device 16A. In this way, the user may provide an intended configuration to network device 16A via user interface 124, and network device 16A may be configured to determine the configuration change based on the intended configuration and the present configuration of network device 16A. For example, configuration evaluation engine 120 may compare the intended configuration received at user interface 124 with the present configuration of network device 16A to determine a difference. Management daemon 118 of network device 16A modifies the configuration of network device 16A based on the configuration change (504). Subsequently, network device 16A sends an indication of the configuration modification to message bus 30 (506).

Message bus 30 includes message queues 32, which enable data segments to be exchanged between SDN controller 20 and network devices 16. For example, message queue 34 is configured to relay data segments from each of network devices 16 to SDN controller 20. Network device 16A may place a sequence of data segments onto message queue 34, where each data segment of the sequence of data segments identifies the respective data segment as originating from network device 16A. Likewise, network devices 16B-16N may place data segments onto message queue 34, each data segment identifying the respective network device of origination. As such, message bus 30 receives the indication of the configuration modification (508) and places the indication of the configuration modification in message queue 34 (510).

SDN controller 20 may retrieve the indication of the configuration modification from message queue 34 (512). Additionally, network device 16A sends data indicative of the configuration change (514) to SDN controller 20 (e.g., via connection 28). SDN controller 20 receives the data indicative of the configuration change (516) from network device 16A via connection 28. SDN controller 20 may store the data indicative of the configuration change separate from the abstract configuration data generated responsive to received intents. Intent and policy engine 24 of SDN controller 20 may compare the data indicative of the configuration change with an abstract configuration, the abstract configuration indicating an intended configuration of network device 16A as driven by SDN controller 20. For example, the abstract configuration may be created by SDN controller 20 to represent the intended configuration of network device 16A input to interface 26, after SDN controller 20 sends indications to network device 16A causing management daemon 118 to implement the intended configuration.

Intent and policy engine 24 compares the data indicative of the configuration change with the abstract configuration associated with network device 16A (518). In this way, intent and policy engine 24 is configured to determine the configuration modification made by network device 16A (504). Subsequently, intent and policy engine 24 may evaluate the configuration modification. In some examples, SDN controller 20 determines that the configuration change is permissible (520). In such examples, SDN controller 20 is configured to update the abstract configuration associated with network device 16A to reflect the configuration change (522). By determining that the configuration change is permissible, SDN controller 20 may determine that the configuration change is compatible with the intended configuration of network device 16A received by SDN controller 20 at interface 26. In other examples, SDN controller 20 determines that the configuration change is impermissible (524) and SDN controller 20 sends a notification to roll back the configuration change (526). The SDN controller 20 may store one or more policies that determine actions to be taken in response to configuration changes on the network devices 16. Actions may include no-op, raise error/warning, and roll back, for instance. Message bus 30 receives the notification to roll back the configuration change (528) and places the notification in message queue 32A (530). Network device 16A retrieves the notification from message queue 32A (532) and modifies the configuration to roll back the configuration change (534).

In some cases, the notification to roll back the configuration change includes a first version number, where the instruction to roll back the configuration change includes an instruction to change the configuration of network device 16A to reflect a configuration associated with the first version number. Network device 16A is configured to determine a second version number associated with the configuration of network device 16A and compare the first version number with the second version number. In response to determining that the first version number is different from the second version number, network device 16A is configured to send, to SDN controller 20 via connection 28, a request for data indicative of a configuration associated with the first version number and receive the data indicative of the configuration associated with the first version number. Subsequently, management daemon 118 may modify the configuration of network device 16A according to the data indicative of the configuration associated with the first version number.

Although the techniques of FIG. 5 are described with respect to network device 16A, the techniques may be applied to determine, manage, or update the configurations of any combination of network devices 16.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Additionally, or alternatively, if implemented in software or firmware, the techniques may be realized at least in part by a computer-readable data storage medium including instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as RAM, read-only memory (ROM), non-volatile random-access memory (NVRAM), EEPROM, Flash memory, magnetic or optical data storage media, and the like. In some examples, an article of manufacture may include one or more computer-readable storage media.

In some examples, the computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A controller comprising:
processing circuitry coupled to memory, wherein the processing circuitry is configured to:
generate data for implementing a configuration change for a network device;
store, to a configuration database of the controller, the data for implementing the configuration change for the network device; and
add, to a message queue of a message bus executed by one or more computing devices separate from the controller, an indication of the configuration change for the network device to cause the network device to obtain, from the configuration database of the controller, the data for implementing the configuration change for the network device.

2. The controller of claim 1, wherein the data for implementing the configuration change comprises a set of instructions for execution by the network device.

3. The controller of claim 1, wherein the data for implementing the configuration change comprises configuration data encoded in at least one of: YAML Ain't Markup Language (YAML), JavaScript Object Notation (JSON), and OpenConfig.

4. The controller of claim 1,
wherein the data for implementing the configuration change for the network device comprises a new abstract configuration for the network device, and
wherein the new abstract configuration for the network device is applicable to network devices manufactured by a plurality of vendors.

5. The controller of claim 1, wherein the processing circuitry is configured to:
receive an intent for a network;
generate, based on the intent for the network, a configuration for the network device;
compare the configuration for the network device with an existing configuration for the network device stored in the configuration database to determine a difference between the configuration for the network device and the existing configuration for the network device; and
in response to determining the difference, generate, based on the difference, the data for implementing the configuration change for the network device.

6. The controller of claim 1, wherein the configuration change for the network device is a primary configuration change, and wherein the processing circuitry is configured to:
receive, from another message queue of the message bus, an indication that a secondary configuration change has been applied to the network device, wherein the secondary configuration change is not directed by the controller;
receive data indicative of the secondary configuration change; and
compare the data indicative of the secondary configuration change to an existing configuration for the network device stored in the configuration database to identify a difference between the secondary configuration change and the existing configuration for the network device;
in response to applying a policy to the difference to determine if the secondary configuration change is permissible, performing an action.

7. The controller of claim 6, wherein the action comprises sending, to the network device via the message queue of the message bus, a notification including an instruction to roll back the secondary configuration change.

8. The controller of claim 7,
wherein the notification further includes a version number,
wherein the instruction to roll back the secondary configuration change comprises an instruction to update the configuration of the network device to a previous configuration associated with the version number, and
wherein the processing circuitry is configured to:
receive, from the network device, a request for data indicative of the previous configuration associated with the version number; and
send, to the network device, the data indicative of the previous configuration associated with the version number.

9. The controller of claim 6, wherein the action comprises sending, to the network device via the message queue of the message bus, a notification including an instruction to update an abstract configuration of the network device to reflect the secondary configuration change.

10. The controller of claim 1, wherein the data for implementing the configuration change for the network device comprises a version number associated with the configuration change.

11. The controller of claim 1, wherein the processing circuitry is configured to:
receive, from the network device from another message queue of the message bus, an indication that the configuration change is applied in the network device.

12. A network device comprising:
processing circuitry coupled to memory, wherein the processing circuitry is configured to:
receive, from a message queue of a message bus executed by one or more computing devices separate from a controller that manages the network device, an indication of a configuration change for the network device;
obtain, from a configuration database of the controller, in response to the indication, data for implementing the configuration change for the network device; and
implement the configuration change, based on the data, to modify a configuration of the network device.

13. The network device of claim 12,
wherein the data for implementing the configuration change comprises a set of instructions, and
wherein the implement the configuration change the processing circuitry is configured to execute the set of instructions.

14. The network device of claim 12, wherein the indication of the configuration change comprises a notification to apply the configuration change, and wherein in response to receiving the indication of the configuration change, the network device is further configured to:
send, to the controller, a request to obtain an abstract configuration;
receive, from the controller, the abstract configuration;
compare the abstract configuration with data indicative of a present configuration of the network device to determine a difference between the abstract configuration and the data indicative of the present configuration; and in response to determining the difference, update, using a management daemon, the configuration of the network device based on the difference.

15. The network device of claim 12,
wherein the data for implementing the configuration change for the network device comprises a new abstract configuration for the network device,
wherein to implement the configuration change, the processing circuitry is configured to:
   determine a difference between the new abstract configuration for the network device and an existing abstract configuration for the network device;
   based on the determined difference, generate instructions for modifying an operational configuration of the network device; and
   execute the instructions.

16. The network device of claim 12, wherein the processing circuitry is configured to:
   receive, via a network management protocol session with a computing device other than the controller, data indicative of a secondary configuration change to the network device;
   modify the configuration of the network device based on the data indicative of the secondary configuration change;
   send, to the controller via another message queue of the message bus, an indication that the secondary configuration change has been applied to the network device; and
   send, to the controller, the data indicative of the secondary configuration change.

17. The network device of claim 16, wherein the processing circuitry is configured to:
   receive, via the message queue of the message bus, a notification including an instruction to roll back the secondary configuration change; and
   roll back the secondary configuration change in response to the notification.

18. The network device of claim 17,
wherein the notification further includes a first version number,
wherein the instruction to roll back the secondary configuration change comprises an instruction to update the configuration of the network device to a previous configuration associated with the first version number, and wherein the processing circuitry is configured to:
   determine a second version number associated with the configuration of the network device;
   compare, using the configuration evaluation engine, the first version number with the second version number;
   in response to determining that the first version number is different from the second version number, send, to the controller, a request for data indicative of a configuration associated with the first version number;
   receive the data indicative of the configuration associated with the first version number; and
   modify the configuration of the network device according to the data indicative of the configuration associated with the first version number.

19. The network device of claim 12, wherein the indication of a configuration change for the network device comprises a version number associated with the configuration change.

20. A computing system comprising:
   a controller comprising first processing circuitry coupled to a first memory, wherein the first processing circuitry is configured to:
      generate data for implementing a configuration change for a network device;
      store, to a configuration database of the controller, the data for implementing the configuration change for the network device; and
      add, to a message queue of a message bus executed by one or more computing devices separate from the controller, an indication of the configuration change for the network device; and
   the network device comprising second processing circuitry coupled to a second memory, wherein the second processing circuitry is configured to:
      receive, from the message queue of the message bus, the indication of the configuration change for the network device;
      obtain, from the configuration database of the controller, in response to the indication, data for implementing the configuration change for the network device; and
      implement the configuration change, based on the data, to modify a configuration of the network device.

* * * * *